C. H. ANDERSON.
DRILLING MACHINE.
APPLICATION FILED APR. 12, 1912.
1,069,995.
Patented Aug. 12, 1913.
12 SHEETS—SHEET 3.
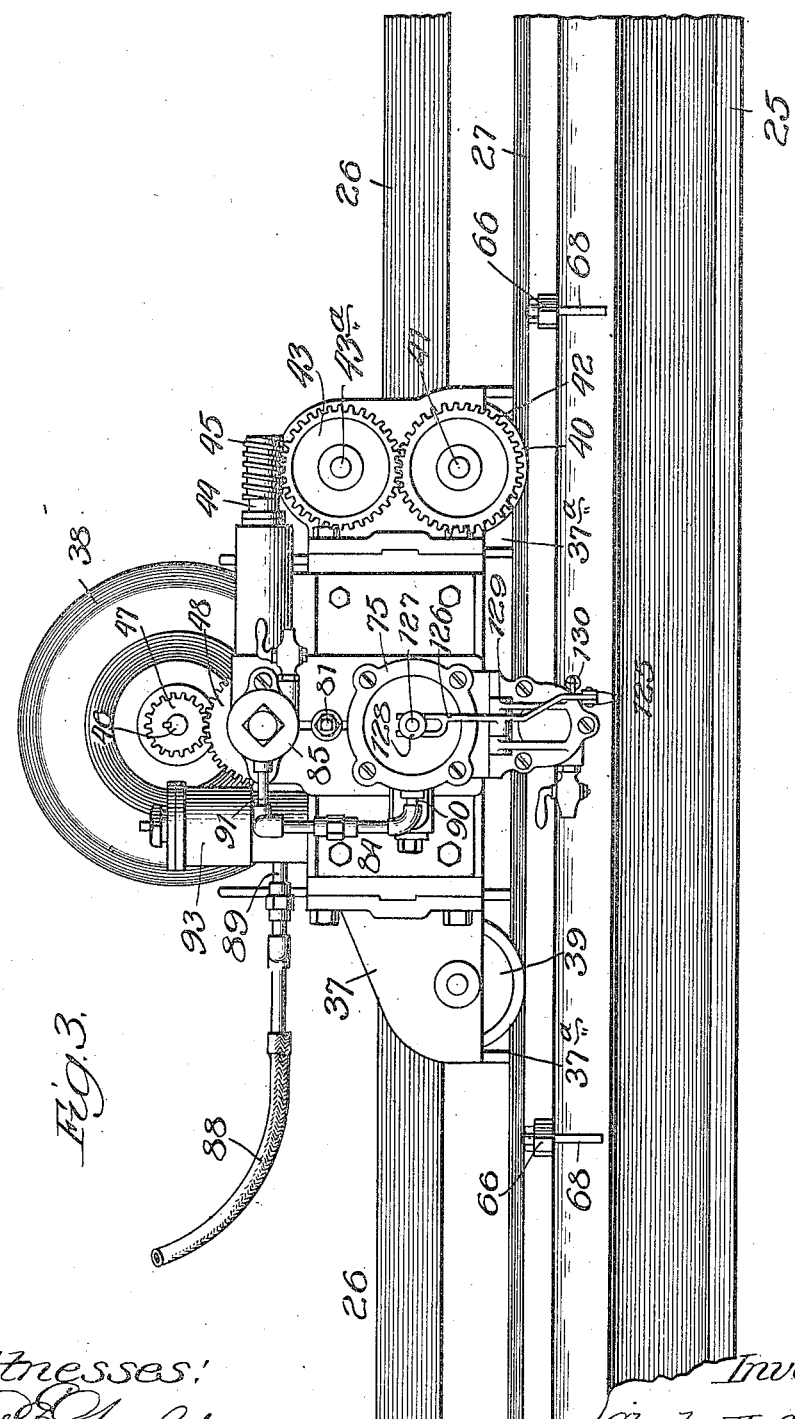

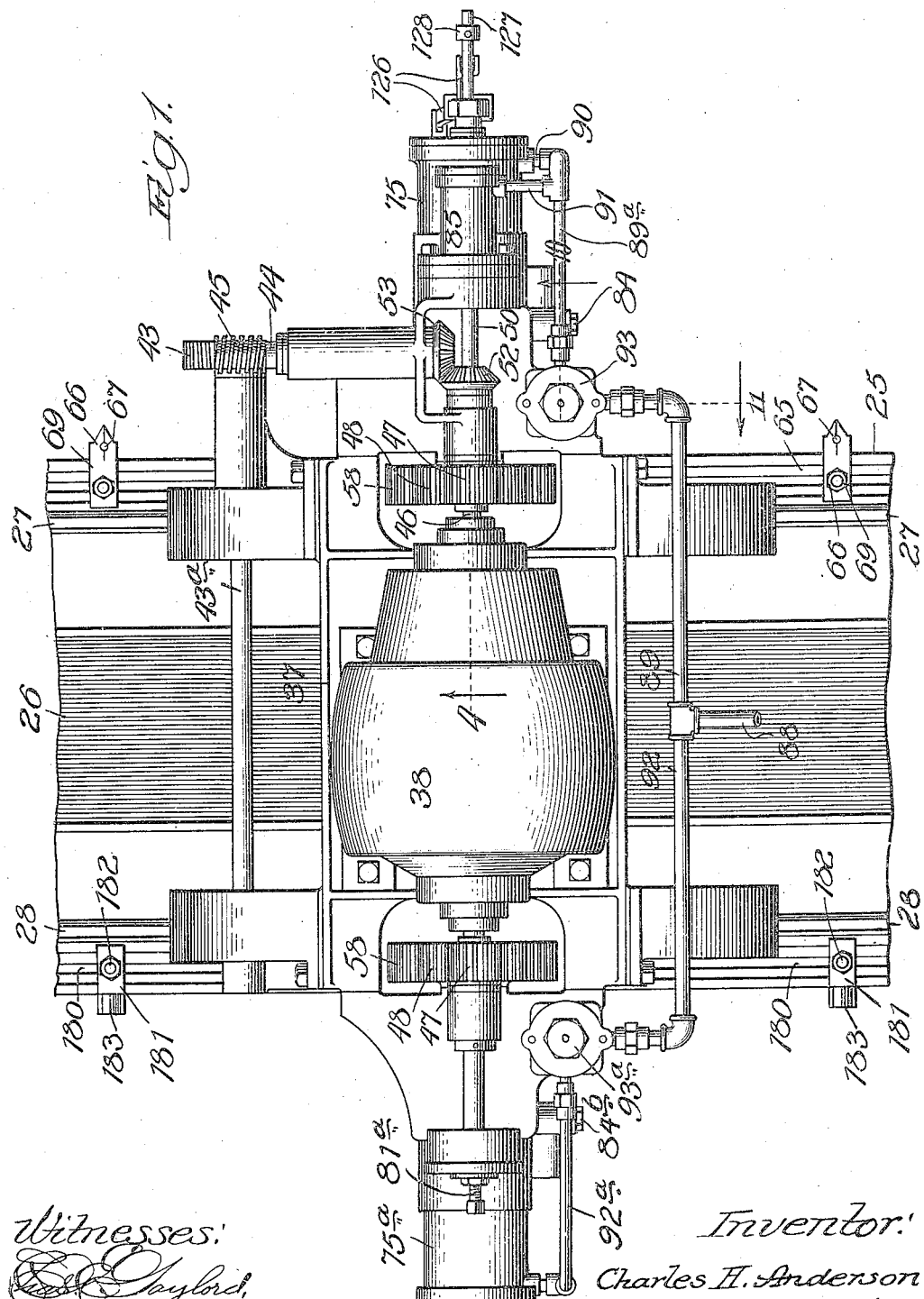

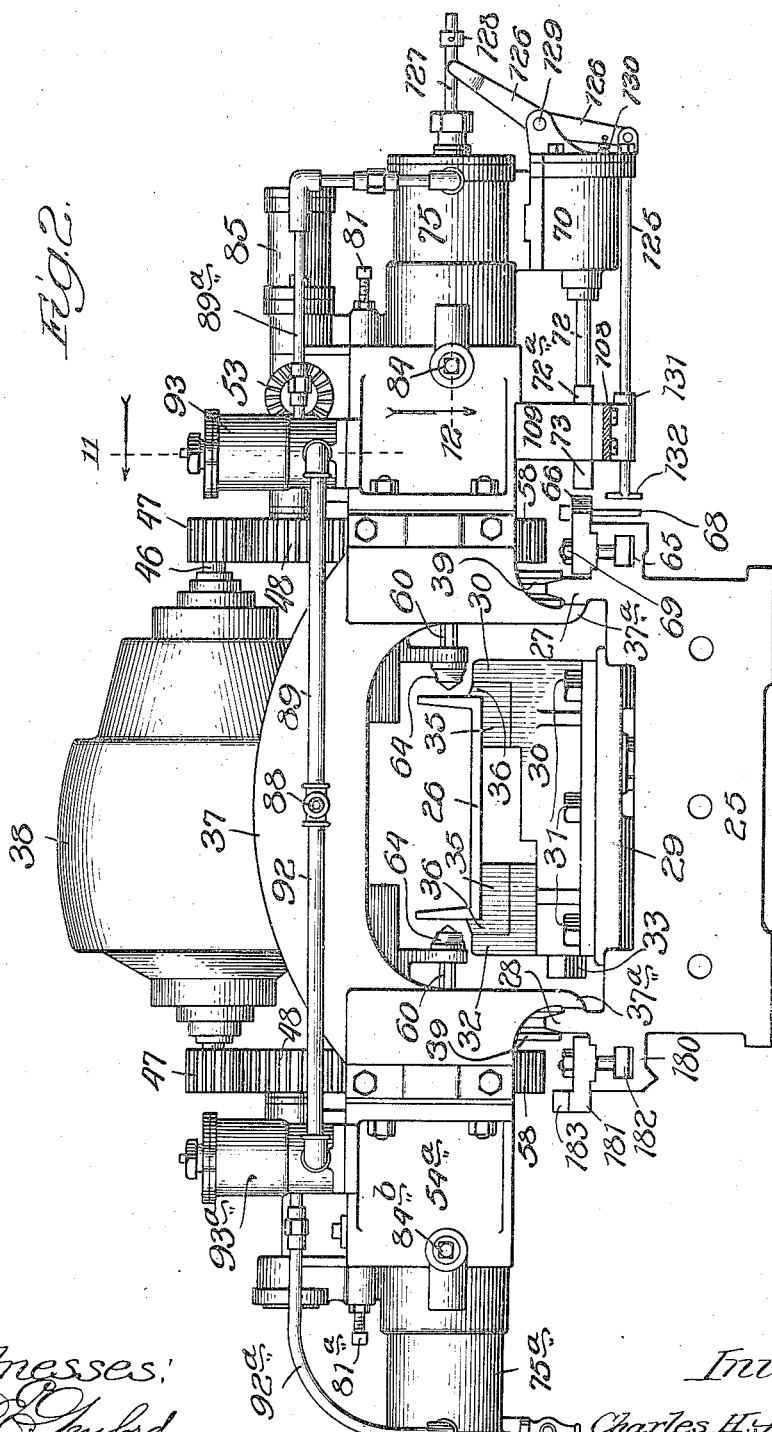

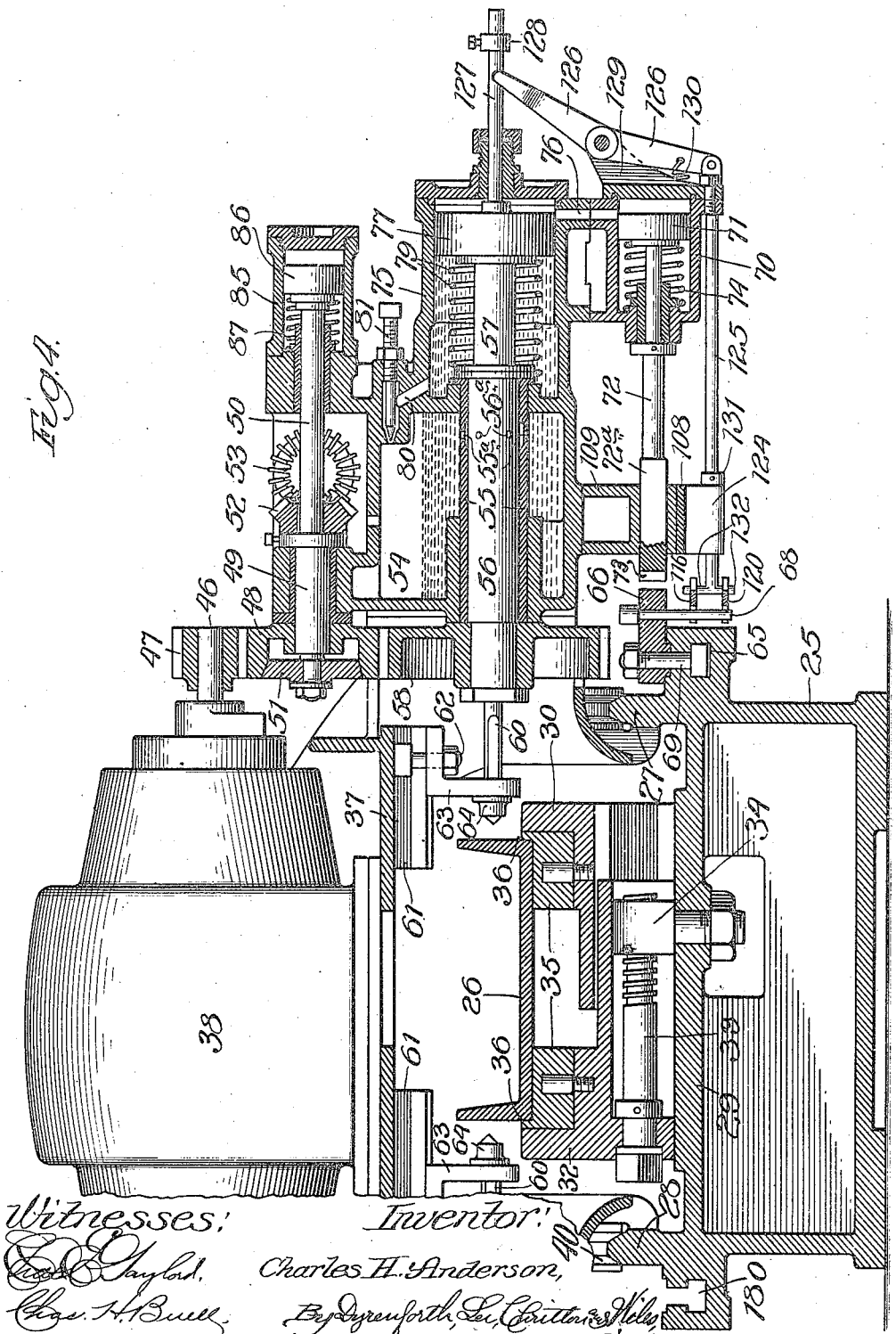

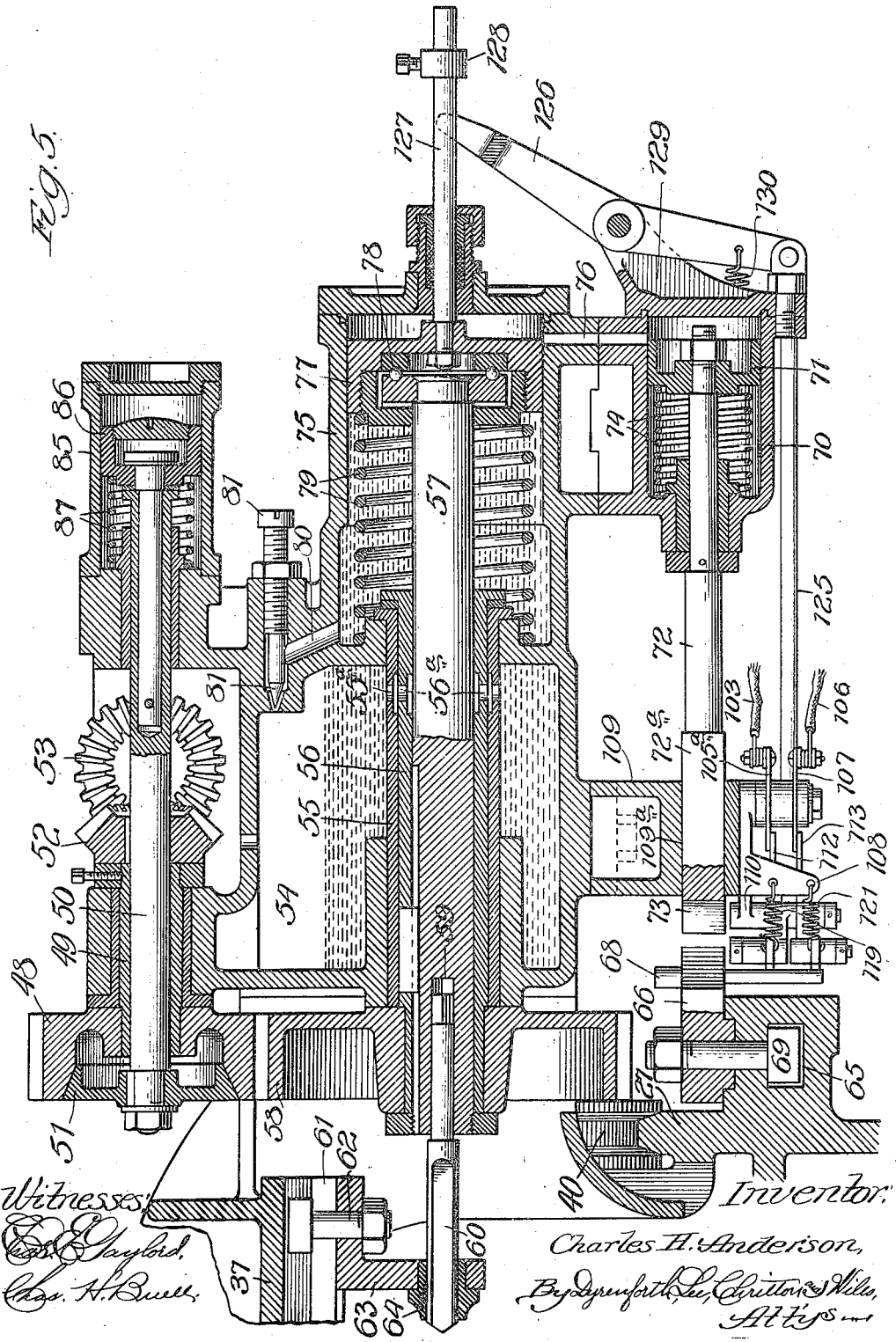

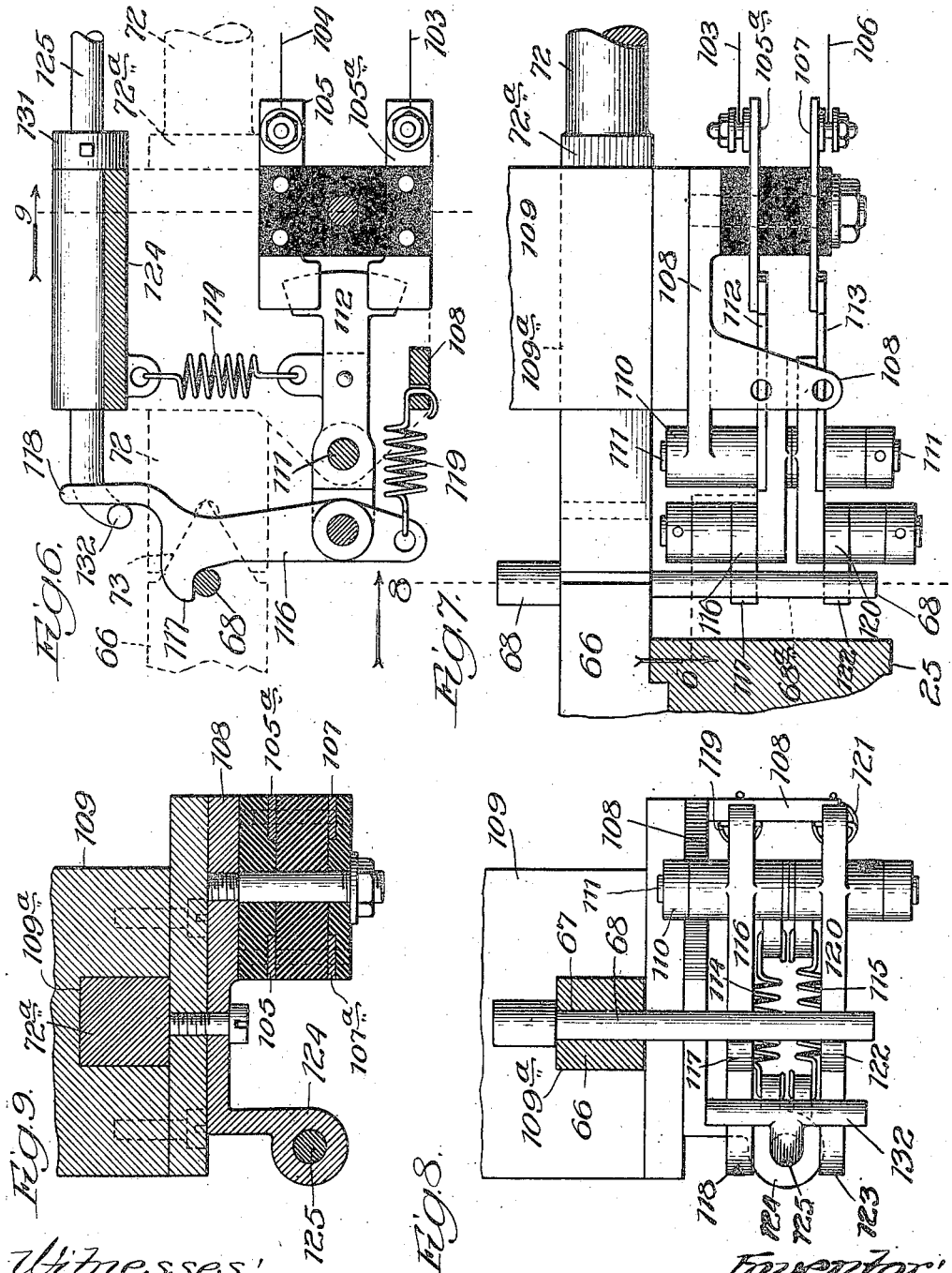

C. H. ANDERSON.
DRILLING MACHINE.
APPLICATION FILED APR. 12, 1912.
1,069,995.
Patented Aug. 12, 1913.
12 SHEETS—SHEET 7.
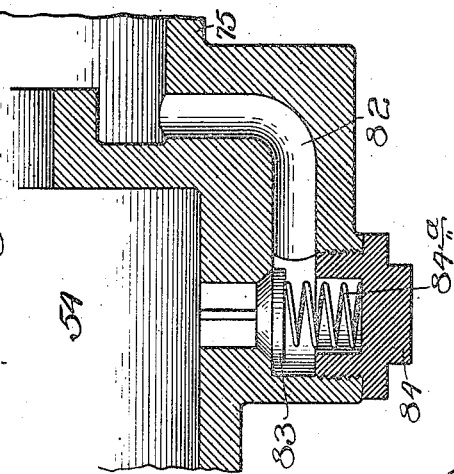
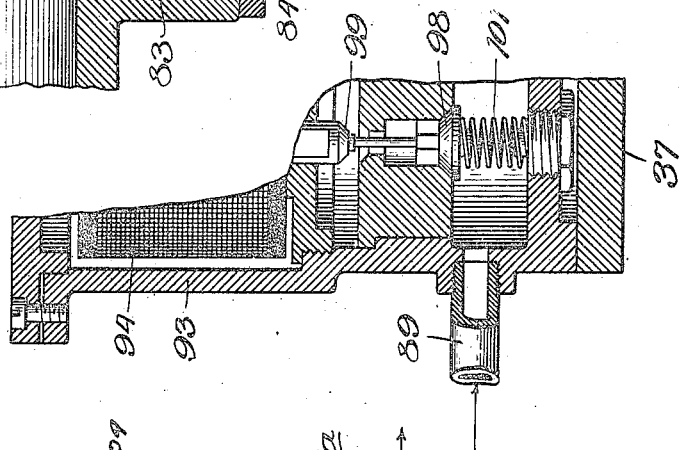
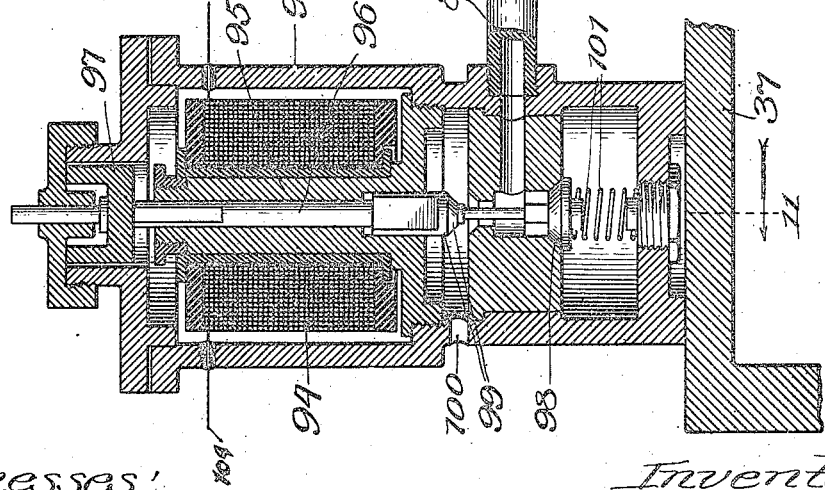
Witnesses:
Inventor:
Charles H. Anderson,

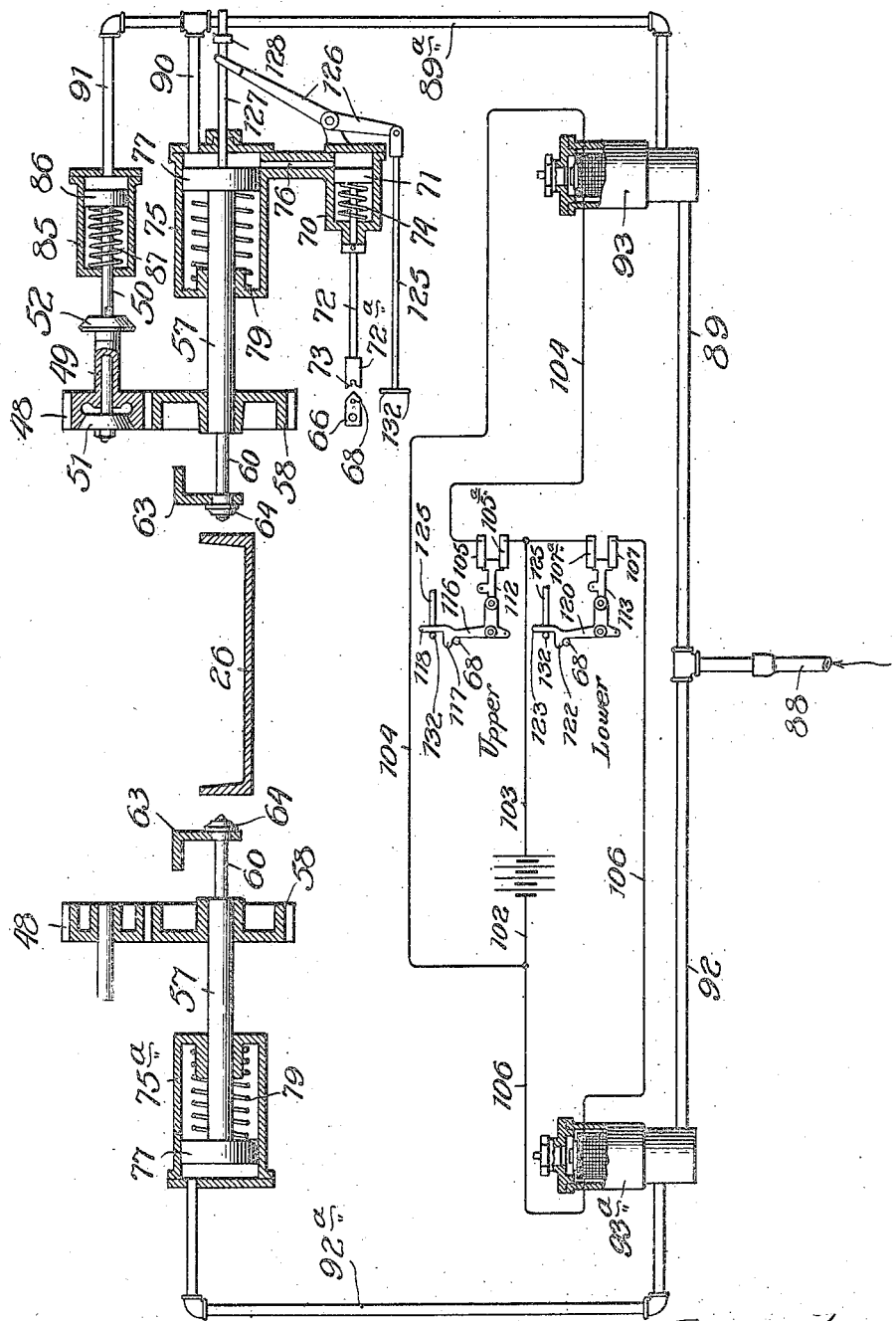

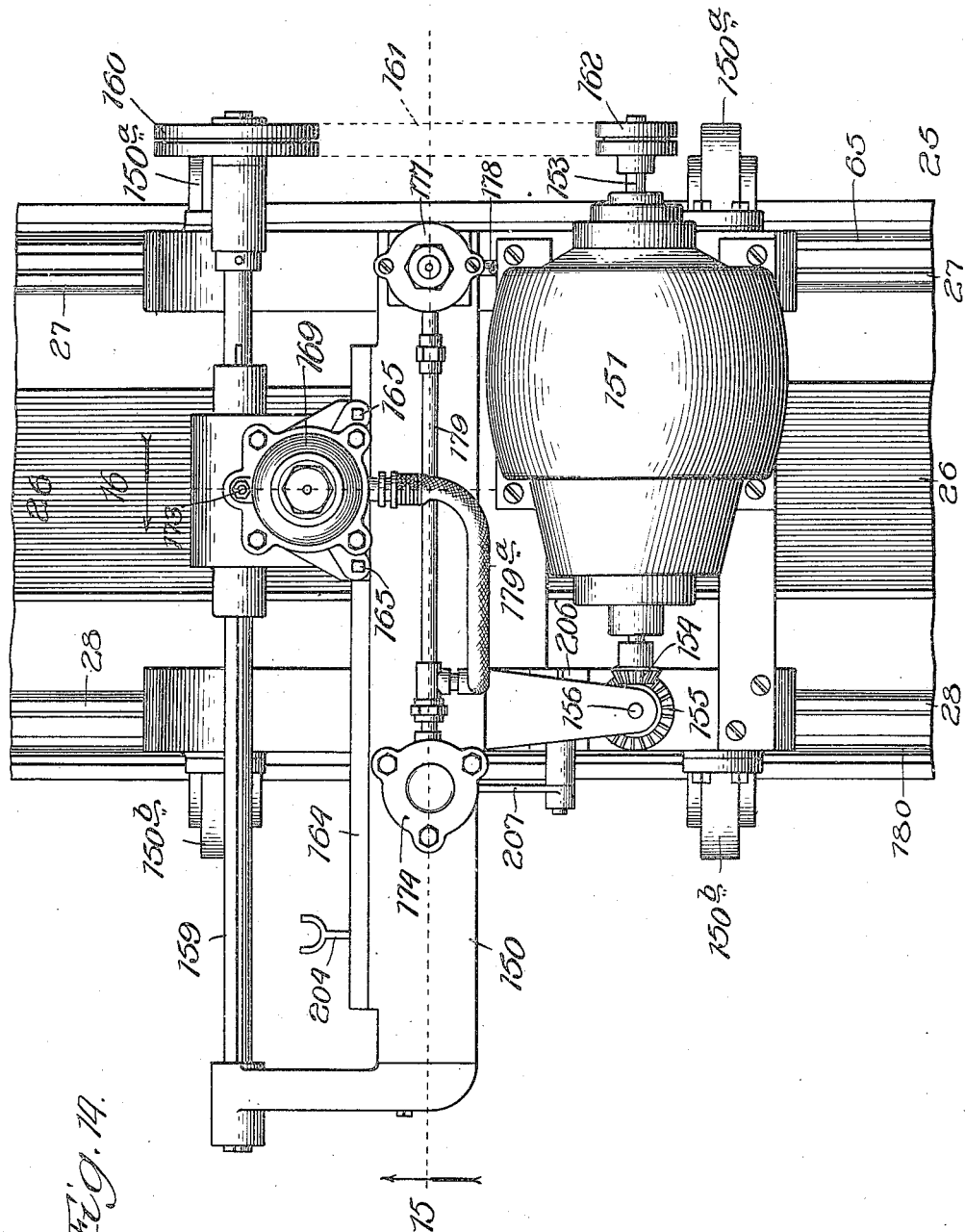

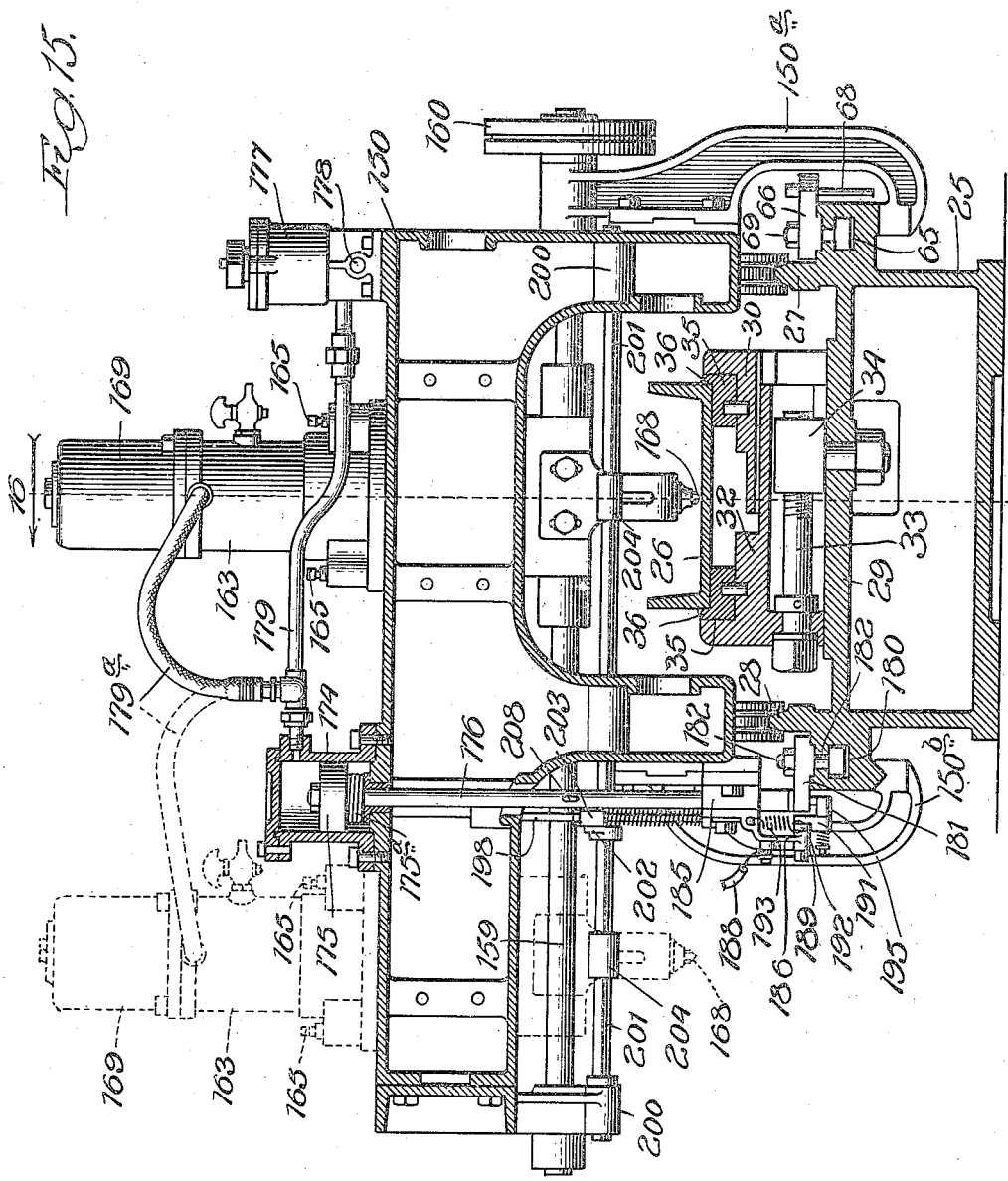

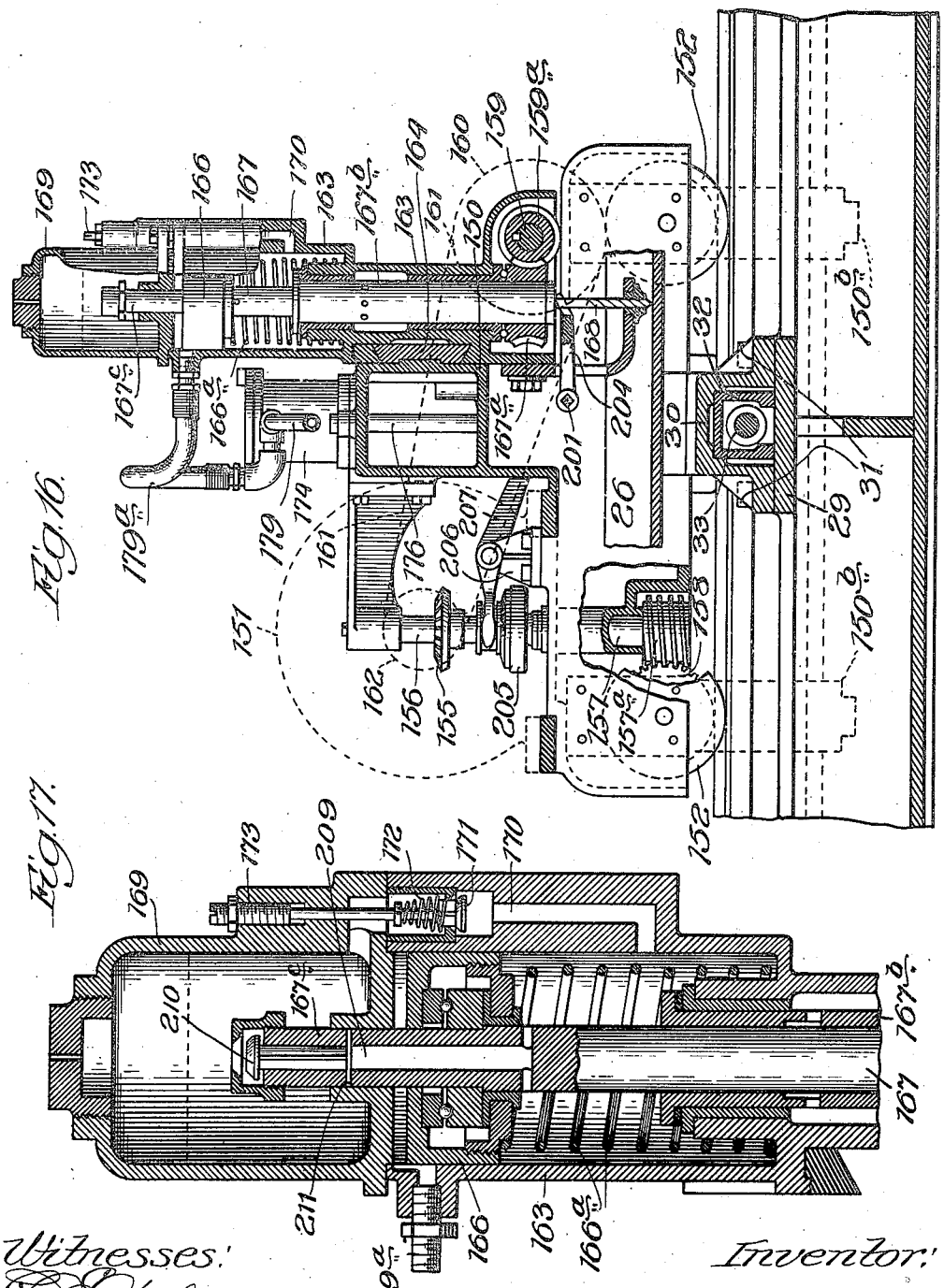

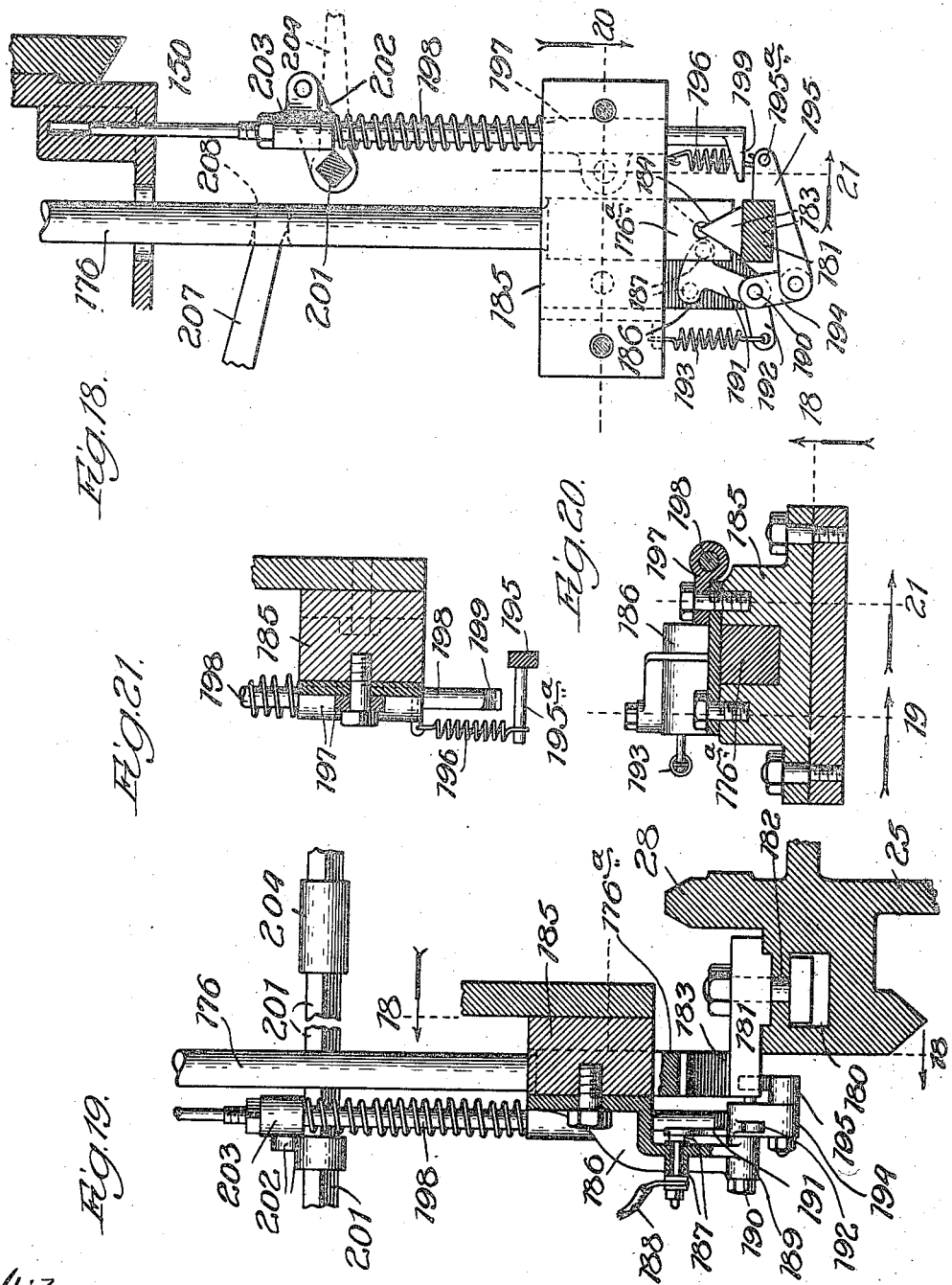

UNITED STATES PATENT OFFICE.

CHARLES H. ANDERSON, OF CINCINNATI, OHIO.

DRILLING-MACHINE.

1,069,995.　　　　Specification of Letters Patent.　　Patented Aug. 12, 1913.

Application filed April 12, 1912. Serial No. 690,423.

*To all whom it may concern:*

Be it known that I, CHARLES H. ANDERSON, a citizen of the United States, residing at Cincinnati, in the county of Hamilton and State of Ohio, have invented a new and useful Improvement in Drilling-Machines, of which the following is a specification.

My object is to provide a machine of generally improved construction adapting it for the drilling of holes at intervals along metal beams, bars, plates, and the like, with speed, as well as great accuracy in accordance with predetermined measurements.

In the manufacture of steel car-body under-frames, for example, wherein the sills are formed of heavy channel-beams of great length, to which numerous parts of the body-framing are to be secured by rivets, it is necessary to carefully lay out and punch or drill a large number of rivet holes in the beams, and as the holes must be in perfect register with those in the parts which are to be riveted thereto, great care and skill on the part of those in charge have hitherto been necessary to avoid mistakes. The practice in preparing the work has usually been to either measure off and mark the positions of the holes on each beam, bar or plate, a laborious procedure subject to inaccuracy, or to provide a carefully designed templet for each part, with attendant labor and expense. It has also been usual in producing the holes to pass the work across a power-punch or drill and stop and position it for each hole to be formed; but the handling of heavy beams and plates in this way is necessarily slow and laborious, and one of my purposes is to avoid the objections incident to this practice by causing the work to remain stationary while the drilling-tool automatically travels and positions itself for each operation.

My improved drilling machine, constructed as herein illustrated, has been devised by me for use, more especially, in providing rivet-holes in channel-beam car-sills. The machine has a frame or bed on which the channel-beam is positioned, a traveling-head carrying horizontally-disposed drills for drilling holes in the channel-beam flanges, and a traveling-head carrying a vertical drill for drilling holes in the body or web of the channel-beam. On the frame are adjustable stops, adapted to be readily positioned with great accuracy along the path of the traveling-heads at the locations where the holes are to be drilled; and the traveling-heads are equipped with automatic mechanism, all as illustrated and hereinafter described, for causing the heads to travel from one end to the other of the beam, pause at each location where a hole is to be formed, and drill the holes during the pauses.

Referring to the drawings Figure 1 is a broken top-plan view of the machine showing a traveling-head carrying drills adapted to operate from opposite sides upon the flanges of a channel-beam; Fig. 2, an end view of the machine showing the same traveling-head in end elevation; Fig. 3, a broken side view of the machine showing the same traveling-head in side elevation; Fig. 4, an enlarged broken section taken on line 4 in Fig. 1; Fig. 5, a still further enlarged broken section also taken nearly throughout on line 4 in Fig. 1, but showing a few additional details; Fig. 6, a plan section taken on irregular line 6 in Fig. 7 showing features of construction of the starting and stopping mechanism for the traveling-head, or carriage, shown in the previous figures and the drill-advancing and retracting mechanisms carried thereby; Fig. 7, a broken side view of features illustrated in Fig. 6; Fig. 8, a section taken on line 8 in Figs. 6 and 7; Fig. 9, a broken section on line 9 in Fig. 6; Fig. 10, an enlarged section taken on line 10 in Fig. 1; Fig. 11, an enlarged broken section taken on line 11 in Fig. 1, corresponding with line 11 in Figs. 2 and 10; Fig. 12, a broken section on line 12 in Fig. 2; Fig. 13, a diagrammatic view, partly in section, of electro-pneumatic mechanisms, whereby movement of the traveling-head or carriage, shown in the previous figures, is controlled and the drills are advanced and retracted; Fig. 14, a top-plan view of the machine showing the traveling-head, or carriage, for the vertical drill and its operating mechanism; Fig. 15, a section taken on line 15 in Fig. 14; Fig. 16, a section taken on line 16 in Figs. 14 and 15; Fig. 17, an enlarged section of details of construction taken on the same line as Fig. 16; Fig. 18, a vertical section taken on line 18 in Figs. 19 and 20 and showing details of construction of the starting and stopping mechanism for the traveling-head carrying the vertical drill, as well as for bringing about the advancement and retraction of the drill; Fig. 19, a section taken on line 19 in Fig. 20;

Fig. 20, a section taken on line 20 in Fig. 18; and Fig. 21, a broken section taken on line 21 in Figs. 18 and 20.

The bed or frame 25 of the machine may be of a length exceeding that of the longest channel-beam 26, or other work, intended to be operated upon. Extending the full length of the bed are the rails 27, 28 and at intervals along the bed, between the rails, are platforms 29 forming facings for vises which clamp and position the channel-beam. The vises may be constructed as illustrated most plainly in Figs. 2, 4, 15 and 16. Each vise has a stationary jaw 30, fastened to the facing 29 by bolts 31, and a movable jaw 32 adjustable by means of a screw 33 working in a stationary nut 34 fastened to the facing. In each jaw is a removable and replaceable block 35 forming a seat for the channel-beam and having shoulders 36 which clamp and position the beam, as shown. The object of the blocks 35 is to prevent wear upon the jaws of the vises and to facilitate positioning of the channel-beam midway between the rails 27, 28. Where a relatively narrower channel-beam than that shown is to be operated upon, companion-blocks 35 having wider shoulders 36 would be substituted for those shown, as will be readily understood.

The traveling-head or carriage for the horizontal drills has a frame or truck 37 on which is mounted an electric motor 38. The truck is supported at one end upon a pair of grooved wheels 39 and at its opposite end upon a pair of grooved wheels 40, all of which ride upon the tracks 27, 28. The wheels 40 are upon stub-shafts 41 carrying gear-wheels 42 which are driven by gears 43 on a cross-shaft 43ª to rotate the rollers. On one side of the truck is a shaft 44 having a worm 45 which drives one of the gears 43 and shaft 43ª.

The armature shaft 46 of the motor 38 is provided beyond opposite ends of the motor-casing with pinions 47 each of which drives an idle gear 48. The gear 48 on one side is upon a hollow stub-shaft or sleeve 49 (see Figs. 4 and 5) journaled in the frame. Extending through the sleeve 49 and rotatable therein is a shaft 50. The shaft 50 is also longitudinally movable in the sleeve 49 and carries a clutch-member or disk 51 adapted to engage and release the gear-wheel, or clutch-member, 48. The shaft 50 carries a bevel-pinion 52 which is splined upon the shaft but permits the shaft to be moved longitudinally through it. The bevel-pinion 52 engages a bevel-pinion 53 on the shaft 44.

It is to be understood that when the clutch-members 48, 51 are in engagement, the shaft 44 is rotated causing its worm 45 to rotate the gear 43 on that side and through the shaft 43ª to turn the rollers 40, thereby to propel the traveling-head; while when the said clutch-members are disengaged the traveling-head may come to a pause. The mechanism for producing engagement and release of the clutch-members will be explained farther on.

On each side of the frame or truck 37 is an oil-chamber 54, through which extends a bearing-sleeve 55 for an inner rotary sleeve 56 through which a drill-shaft or spindle 57 extends and to which it is splined, as shown in Fig. 5. Each of the sleeves 56 carries a gear-wheel 58 driven by the respective gear 48. In the end of each drill-shaft 57 is a socket having a square base 59 to receive the square end of the shank of a drill 60. In the frame 37 above each drill 60 is a T-slot 61 to which is attached, by means of a bolt 62, a hanger or guide-piece 63 for the drill 60. The hanger is fitted with a bushing 64 through which the drill passes. The hangers may be adjusted toward and away from the longitudinal center of the machine, to be suitably near the particular channel-bar 26, their purpose being to guide and steady the drills close to the work.

Extending the full length of the bed 25 at the outer side of the rail 27 is a T-way 65, and for each hole that is to be drilled on that side of the channel-beam 26 a stop 66 is provided; the purpose of the stops being to engage and release mechanism on the traveling-head, which mechanism, as hereinafter explained, effects stoppage and starting of the head and advancement and retraction of the drill or drills carried thereby. Each stop 66 consists of a block having a wedge-shaped end (as shown in Fig. 1) and a hole 67 to receive a lug or pin 68. The stops are initially positioned along the T-way, in accordance with measurements as required for properly locating the holes to be drilled, and fastened in place by the nut-bolts 69 carried by the blocks. On the traveling-head, in the position shown, is a cylinder 70 containing a piston 71 having a stem or plunger 72 provided in its end with a V-shaped socket 73 (shown in Fig. 13 and also by dotted lines in Fig. 6) adapted to fit over and engage the V-shaped ends of the stops 66 when registering therewith. The piston 71 and its stem are held normally in retracted position by a spring 74. Above the cylinder 70 is a cylinder 75, the two cylinders being in communication through an air-port 76. Working in the cylinder 75 is a piston 77 having a ball-bearing swivel-connection 78 with the end of the drill-shaft or spindle 57. The piston 77, drill-shaft and drill are held normally in the retracted position indicated by a spring 79. Extending from the oil-chamber 54 to the interior of the cylinder 75 is an oil-escape passage 80 governed by an adjustable needle-valve 81. Extending from the oil-chamber to the interior of the cylinder 75 (see Fig. 12) is an oil-return passage 82 containing a check-valve 83 normally seated in the direction of the oil-chamber by a spring 84ª held in a screw-cap 84. Above the cylinder 75 is a cylinder 85 in which works a piston 86 having a swivel connection with the end of the clutch-shaft 50 above described. A spring 87 tends normally to move the piston and clutch-shaft in the direction of producing engagement between the clutch-members 48, 51. On the opposite side of the traveling-head is another drill 60 similarly guided and connected with a piston in a cylinder 75ª (corresponding with the cylinder 75) and connected, in the same way, with an oil-chamber or reservoir 54ª through an oil-escape passage, governed by a needle-valve 81ª, and an oil-return passage, similar to the passage 82, containing a check-valve seated by a spring held by the cap 84ᵇ. As both drill-shaft cylinders and their attendant parts are the same, it is thought that the description which has been given of one will suffice for both.

The reference numeral 88 designates a compressed-air supply-pipe, in the form of a rubber hose, leading from an air-compressor or compressed-air supplier (not shown). Extending from the pipe 88 is a pipe, in sections 89, 89ª, the latter having branches 90 and 91 communicating, respectively, with the cylinders 75 and 85, as indicated most plainly in the diagrammatic view (Fig. 13). A pipe, in sections, 92 and 92ª, extends from the pipe 88 to the cylinder 75ª. Interposed between the pipe-sections 89, 89ª is an electric valve 93, detailed in Figs. 10 and 11. In the valve-casing is an electro-magnet 94 having a core 95 through which extends a valve-stem 96 carrying an armature 97. On the stem 96 is a valve 98, which controls communication between the pipe-sections 89, 89ª and a valve 99 which opens and closes communication between the pipe-section 89ª and an exhaust-port 100. A spring 101 tends normally to raise the stem and armature and thus normally close the valve 98 and open the valve 99. The electro-magnetic valve 93 illustrated is of known construction. When the magnet is energized it causes the armature 97 to be drawn down to seat the valve 99 and open the valve 98. Interposed between the pipe sections 92, 92ª is an electric valve 93ª in every way similar both in construction and operation to the electric valve 93.

Referring to Fig. 13, the numerals 102, 103 designate the lead wires of an electric circuit. The wire 102 has a branch 104 extending through the winding of the electric valve 93 to a terminal 105. The wire 102 has another branch 106 extending through the winding of the electric valve 93ª to a terminal 107. The wire 103 extends to the terminals 105ª, 107ª. The companion-terminals 105, 105ª are above the companion-terminals 107, 107ª, all of the said terminals being insulated and attached to a bracket 108 carried by a bearing-bracket 109 on the under side of the oil-reservoir 54. The bearing-bracket 109 has a squared opening 109ª through it for a squared portion 72ª of the plunger stem 72. On the bracket 108 is a vertical boss 110 (see Fig. 7) carrying a downwardly extending pin 111 on which are mounted an upper switch-lever 112 and a lower switch-lever 113. The switch 112 is adapted to make contact with and close the terminals 105, 105ª, and the switch 113 is adapted to make contact with and close the terminals 107, 107ª. A spring 114 (Figs. 6 and 8) tends normally to draw the switch 112 away from the terminal 105ª to thus break the circuit, and a similar spring 115 performs the same office for the switch 113. Pivoted upon the end of the switch or lever 112 is a latch 116 having a hook-portion 117 and a finger-portion 118. A spring 119 carried by the bracket 108 and connected with the latch 116 tends to swing the latter at its hook-portion 117 in the direction to the left in Fig. 6, whereby the hook would engage the pins 68.

The numeral 120 designates a latch in every way similar to the latch 116 and in a plane below the latter, pivoted upon the end portion of the switch or lever 113 and having a spring 121 operating in the same way as the spring 119. The latch 120 has a hook-portion 122, similar to the hook 117, and a finger-portion 123 similar to the finger-portion 118 of the latch 116. Extending downward from the bracket 108 is a hanger portion 124 (Figs. 4 and 9) forming a guide for a plunger-rod 125 which at its outer end is connected with the lower end of a lever 126 which at its upper end is bifurcated (as shown in Fig. 3) and loosely embraces a rod 127 carried by the piston 77, before described. On the rod 127 is an adjustable stop 128. The lever 126 is fulcrumed between its ends on a bracket 129 carried by the head of the cylinder 70, and a spring 130 tends normally to swing the lever to the position indicated in Fig. 4 to thrust the rod 125 until a stop thereon, 131, contacts with the bearing 124. At its inner end the rod 125 has a T-shaped head 132, one arm of which is adapted to engage the finger 118 of the latch 116 and the other arm of which is adapted to engage the finger 123 of the latch 120.

Preliminary to the operation of the machine, the attendant will position the stops 66 along the T-way 65 so that a stop will occur at each position where a hole is to be bored on that side of the channel-beam 26 when the latter is placed in position and clamped by the vise-jaws 30, 32. In the present machine, which is intended to operate more especially on channel-bar car-sills, the work may be so laid out that the holes to be provided in the opposite channel-bar flanges will register with each other, and where more holes are to be provided in one flange than in the other, wherever two holes occur, they will be in line with each other.

The channel-bar 26 is positioned upon the bed-frame with the flange wherein the greater number of holes are to be drilled at the side nearest the rail 27, and at whatever stop a hole is to be drilled only in the adjacent channel-bar flange a short pin is placed in the hole of the block 66, to extend into the path of the latch 116 only, while where holes are to be drilled simultaneously in opposite sides of the channel-bar a long pin 68 is placed in the block 66 to extend across the path of both the latch 116 and the latch 120, as indicated in Fig. 7 (where the dotted line 68ª indicates the length of a short pin). When the motor 38 is started it operates continuously and through the gears 47, 48, 58 rotates the drill-shafts continuously. Normally the clutch-members 48, 51 are pressed into engagement by the spring 87, so that in the rotation of the armature shaft of the motor the traveling-head is propelled and caused to move along the tracks 27, 28. The pins 68 extend, as before stated, into the path of the hook-portion 117 of the latch 116, and also, when holes are to be drilled from opposite sides, into the path of the hook-portions of both the latches 116, 120. When the hook-portion 117 of the latch 116 contacts with a pin 68 further movement of the carriage causes the latch to be drawn longitudinally into the position indicated in Fig. 6; and in moving to that position it swings the switch-lever 112 against the resistance of the spring 114 into the position where it makes contact with both terminals, 105 and 105ª. At the moment the circuit is thus closed through the contacts 105, 105ª the magnet in the electro-magnetic valve 93 is energized to attract the armature 97, open the valve 98 and close the valve 99, causing compressed air to flow from the pipe-section 89 to the pipe-section 89ª and into the cylinders 85, 75, 70. This flow of compressed air to the cylinders starts just as the V-shaped socket 73 of the plunger 72 is opposite a V-shaped block or stop 66. As the oil in the cylinders 75, 75ª can escape but slowly it operates as a check to the advance of the drills; therefore as compressed air enters the different cylinders it will cause the piston 86 to disengage the clutch-members 48, 51 and move the piston 71, to cause the plunger 72 to engage the stop 66, before the piston 77 advances the rotating drill to the work. The disengagement of the clutch-members 48, 51 causes propulsion of the traveling-head to cease and the engagement of the plunger 72 with the block 66 so locks the head, as it stops, that the drill 60 will be properly positioned for drilling the hole.

In practice, the release of the clutch-members takes place before the plunger 72 engages the respective block 66, and in said engagement the sliding of the wedge-shaped socket 73 along the tapering block effects accurate positioning of the drills with reference to the work. The drills 60 are of high-speed steel and are rotated at high-speed; and as a means for controlling the pressure and speed of advance of the drills while drilling, the oil-passage 80 is provided at the cylinders 75, 75ª. The speed of escape of oil from a cylinder, under piston pressure, to the adjacent oil-chamber 54 is governed by the needle-valve 81, and the latter may be readily adjusted to properly control the feed of the drills with reference to their speed of rotation and to the air-pressure applied. The retardation of the piston 77, produced by the more or less slowly escaping oil, not only causes the drill to advance at desired speed, but prevents the drill and attendant parts from jumping forward when the drilling of the hole is completed. In the sleeve 55 is a series of perforations 55ª, and in the sleeve 56 is a coincident series of perforations 56ª, through which the rotating parts are lubricated. As the drill nears the end of its working thrust, the stop 128 on the rod 127 contacts with the lever 126 and swings the same on its fulcrum, causing the rod 125 to engage at its T-head 132, with the latches 116, 120 and withdraw them out of engagement with the pin 68. When the latches are freed from the pin 68 the springs 114, 115 operate to turn the switch-levers 112, 113, breaking contact between the terminals 105, 105ª and between the terminals 107 and 107ª, thereby deënergizing the magnetic-valves 93, 93ª and permitting their springs 101 to close the valves 98 and open the valves 99, to exhaust the cylinders. The return of the pistons may be so timed, in operation, that the drills will first be withdrawn from the holes they have made, and immediately afterward the traveling-head will be freed from the stop 66 and the clutch-members will engage and cause the traveling-head to move to the next stop, where the drilling operation is repeated. In the outward movement of the pistons 77 to withdraw the drills from the holes, oil passes freely from the oil-chambers to the cylinders through the passages 82 by unseating the valve 83, permitting quick withdrawal of the drills by the springs 79. Thus, when the traveling-head is started from one end of the machine it moves from point to point along the bed-frame and channel-bar and drills holes in the latter in rapid succession and with great accuracy. Furthermore, when once started the operations are automatic until the traveling-head is stopped at the opposite end of the bed-frame.

The vertical drill, illustrated in Figs. 14 to 21 inclusive, operates to all intents and purposes like the drills on the traveling-head described. The traveling-head or carriage for the vertical drill consists of a frame or truck 150. Mounted on the truck is an electric motor 151 and the truck travels upon the grooved wheels 152, one of which is driven from the motor shaft 153 through a bevel-gear 154 meshing with a bevel-gear 155 on a vertical shaft 156 carrying a sleeve 157 having a peripheral worm 157$^a$ meshing with a gear, 158, on the grooved driving-wheel 152. The mechanisms for producing starting and stoppage of the traveling-head 150, and for advancing and retracting the drill carried thereby, operate, to all intents and purposes, like the corresponding mechanisms provided upon the traveling-head 37, before described, except that the fact that the drill works vertically necessitates a modification in the arrangement and disposition of parts. Journaled on the truck is a shaft 159 carrying a belt-pulley 160 driven by a belt or chain 161 from a pulley 162 on the motor armature-shaft 153. The vertical drill cylinder 163 is mounted on a horizontally-extending dovetail guide 164 so that it may be moved to different positions in the direction transversely of the machine, as indicated by full and dotted lines in Fig. 15. It may be moved beyond one side of the bed-frame and may be locked in any location upon the traveling-head by means of set-screws 165, in a common manner, which it is not thought necessary to detail in the drawings.

The cylinder 163 corresponds with the cylinder 75, before described, and contains a piston 166 to which is swiveled the drill-shaft 167 carrying the drill 168. Above the cylinder 163 is an oil-chamber 169 from which extends a passage 170 for oil to the cylinder 163. In the passage 170 is a check-valve 171 which may open downward against the resistance of a light spring 172, but is prevented from entirely closing by an adjustable screw 173. In the downward movement of the piston 166 to advance the drill, the oil is squeezed upward through the passage 170 and small opening at the valve 171, while in the upward movement of the piston 166 to retract the drill oil is drawn freely through the passage 170 to the cylinder 163 by opening the check-valve 171. On the truck 150 is a cylinder 174 containing a piston 175 on a stem, or plunger-rod 176. These parts corresponding to all intents and purposes with the cylinder 70, piston 71 and rod 72, before described. Also on the truck is an electro-magnetic valve 177, corresponding with the valves 93, 93$^a$ described, interposed between a compressed air-supplying pipe 178 and a pipe 179 leading to the cylinder 174, and a branch pipe 179$^a$ leading to the cylinder 163. At the outer side of the rail 28, and extending the full length of the bed-frame, is a T-slot 180 along which are positioned blocks or stops 181, the same being secured in adjusted position by means of the headed bolts 182. On the outer end of each block 181 is an upwardly extending V-shaped projection 183. In the lower square end-portion 176$^a$ of the rod 176 is a V-shaped socket 184 adapted to engage the stop-projections 183, as plainly indicated in Fig. 18. The squared portion 176$^a$ of the rod 176 works through a squared opening in a bearing-plate 185 secured to the traveling-head. Secured against the plate 185 is a bracket 186, carrying a pair of electric contacts 187 which are interposed in an electric circuit (not shown) of which 188 is a lead-wire, and provided at its lower end with a horizontal bearing-boss or sleeve 189 fitted with a bolt or bearing-stud 190. Journaled on the stud 190 is a switch-lever 191 having a head adapted to slide against and close the contacts 187, an arm connected through a spring 193 with the bracket 186, and an arm 194 on which is pivoted a latch 195 held normally in raised position by a spring 196. Working through an eye-piece 197 secured to the bracket 186 is a vertically extending plunger-rod 198 having a foot 199; and on the free end-portion of the latch 195 is a laterally-extending pin 195$^a$ in the path of the foot 199. Journaled at opposite ends in bearings 200, toward opposite ends of the truck, is a squared rock-shaft 201 carrying an arm 202 pivotally connected at its opposite end to a bearing-piece 203 on the rod 198 and also carrying similar bifurcated fingers 204, one adjustable longitudinally of the shaft at one side of the arm 202 and the other adjustable along the shaft at the opposite side of said arm. The purpose of the fingers 204 is to extend under and into the path of the drill-shaft 167, as most plainly indicated in Fig. 16; two fingers 204 being provided as shown, so that one may be in the path of the drill-shaft when the drill and its cylinder are adjusted at one side of the arm 202, and the other one may be in the path of the drill-shaft when the drill-cylinder is moved to the other side of the arm 202.

The sleeve 157 (shown in Fig. 16) is normally loose upon the shaft 156, but the said shaft and sleeve are provided with companion clutch-members 205 which when in engagement cause the sleeve to be rotated by the shaft. Pivoted upon a bracket 206 carried by the truck is a clutch-shipping lever 207 which at one end engages the sliding member of the clutch 205 and at its opposite end enters a slot 208 (see Fig. 15) in the plunger-rod 176. In practice, the stops or blocks 181 are initially positioned along the T-slot 180 and tightened in place wherever the drill is to be actuated. When the electric motor 151 is started it drives the shafts 156 and 159 continuously and, the rod 176 being normally raised by the spring 175$^a$ (shown in Fig. 15), the clutch-lever 207 is in the position of causing engagement between the clutch-members 205, so that the sleeve 151 and worm 157$^a$ turn to propel the carriage, or traveling-head, along the track. The blocks 181 are in the path of the latch 195, when the latter is in its normally raised position (shown in Fig. 18), and when the latch engages a stop it is drawn to the position shown in Fig. 18, swinging the switch-lever 191 to close the circuit through the contacts 187, excite the electro-magnet in the valve-device 177 and cause compressed air to be directed thereby into the cylinders 174, 163. The effect of exciting the electro-magnetic valve 177 is to cause the compressed-air entering the cylinder 174 to press down the piston 175 and rod or plunger 176 to cause the latter at its V-shaped end to engage the V-shaped projection 183 and position and lock the traveling-head. In the descent of the rod 176 it swings the clutch-shipping lever 207 to disengage the clutch-members 205 and release the carriage-driving means. Following the stopping and positioning of the carriage, or traveling-head, the compressed-air entering the cylinder 163 presses down the piston 166, and drill-shaft 167 and feeds the drill 168. As shown in Fig. 16, the drill-shaft is driven constantly through a worm 159$^a$, on the shaft 159, which meshes with a worm 167$^a$, on the drill-shaft sleeve 167$^b$, the construction of which is substantially the same as the sleeve 56 shown in Fig. 5. The downward movement of the drill is governed by the escape of oil from the cylinder 163 to the oil-reservoir 169 through the regulating-valve 171, which operates in substantially the same way as the regulating-valve 81 before described.

To prevent the accumulation of air in the cylinder 163, beneath the piston 166, I provide the stem 167 with an extension 167$^c$ which extends through the piston and works through an opening in the base of the oil-chamber 169. Extending from the underside of the piston through the stem-extension 167$^c$ to the upper end thereof is a vent-passage 209 containing an upwardly closing check-valve 210 which, when open, rests on a cross-pin 211. This check-valve is closed, in the down-stroke of the piston, by the upward pressure of the oil in the cylinder 163, and opens in the upstroke of the piston permitting any air beneath the piston to rise through the oil and escape. As the drill nears the end of its downward movement through the work the drill-shaft engages and swings down the finger 204 to rock the squared shaft 201, thereby forcing down the plunger-rod 198 and causing it to release the latch 195 from the stop 181 and permit the spring 193 to swing the switch-lever 191 to break the contacts 187. This breaking of the contacts cuts off the current to the electro-magnetic valve, thereby causing the same to shut off the air to the cylinders 174, 163 and permit the cylinders to exhaust. In the exhausting of the cylinders the drill is raised from the work by the spring 166$^a$ and the spring 175$^a$ acts to raise the rod 176, to release it from the stop 183, and swing the clutch-lever to cause the clutch-members to engage and the carriage to travel forward to the next location, where the operation is repeated.

To steady the traveling-head 37 in its movement along the bed-frame and prevent lateral play thereof, under the thrust of the drills, I provide bearing-projections 37$^a$ on the head which slide against the inner sides of the track-rails 27, 28; and for the purpose of steadying the traveling-head 150 the same is equipped with brackets 150$^a$ on one side, riding at their ends under and against the T-way 65, and with a bracket 150$^b$ on the opposite side having a V-shaped bearing engagement with the under side of the T-way 180. The plunger 72 with the projections 37$^a$, and the plunger 176 with the brackets 150$^a$, form each a three-point engagement with the bed-frame. As they clamp the latter they bring the traveling-head to a stop, without material jar, and insure accurate positioning thereof at right-angles to the frame for each drilling operation.

One of the great advantages of my improved drilling-machine lies in the ease and accuracy with which the relative positions of the holes to be drilled may be laid out. Each block 66 has a central mark on its surface, and when the first block is positioned the others may be accurately located by measurements taken therefrom with a tape-measure. Where a plurality of similar channel-beams 26, or other pieces of work, are to be similarly prepared an operator in authority may lay out the holes, by properly positioning the stops in the T-ways, and leave the rest with safety to the care and intelligence of an ordinary workman. In practice, the traveling-heads and parts carried thereby may weigh comparatively little, require but little power to propel them rapidly from point to point along the bed-frame, be started and stopped quickly and without jar, and be accurately positioned at each pause by the engagement of the plunger-rods with the V-shaped stops; while the channel-beams, or other pieces of work, are often very heavy and unwieldy to handle. Thus my improved machine when once started, not only drills the holes throughout the work, automatically, quickly and accurately, but requires comparatively little power to run it and but little, if any, attention during its operation.

It is very desirable in practice that the feed of each drill shall be controlled with reasonable accuracy in accordance with its speed of rotation and the air-pressure. This is accomplished in the present machines by the oil-check mechanisms described, which may be readily adjusted to properly retard the escape of oil back to the oil-chambers, while permitting rapid flow of oil to the drill-piston cylinders, and consequent quick retraction of the drills, after each drilling operation.

The foregoing description is intended to convey a clear understanding of my improvements, in what I now believe to be the best form of their embodiment, and no undue limitation should be understood therefrom.

What I claim as new and desire to secure by Letters Patent is—

1. In a drilling-machine, the combination of a frame and means thereon for holding the work in a stationary position, adjustable stops on the frame, a traveling-head movable upon the frame, propelling means for the head and drill, drill-rotating means, drill-advancing means and drill-retracting means, all carried by the head, a stop-engaging latch on the head and means actuated by movement of the latch for stopping said propelling means and advancing the drill.

2. In a drilling-machine, the combination of a stationary frame and means thereon for holding the work in a stationary position, a traveling-head and means for moving it upon the frame along the work, a drill and drill-rotating means carried by said head, stops upon the frame at different points along the work in the path of movement of the head, stop engaging and releasing mechanism on the head, and drill-advancing means actuated by engagement of said mechanism with a stop.

3. In a drilling-machine, the combination of a frame, and means thereon for holding the work in a stationary position, a traveling-head on the frame, stops adjustable along the path of the head to the positions, with reference to the work, where the drilling operations are to occur, propelling means for the head, a drill, drill-rotating means, drill-advancing means and drill-retracting means, all carried by the head, stop-engaging and disengaging latch-mechanism on the head, mechanisms, actuated by the engagement of the latch-mechanism with a stop, for stopping the said propelling means and actuating the drill-advancing means, and mechanism actuated by the final advance movement of the drill to retract the latter, release the latch-mechanism from the stop and start the said propelling-means.

4. In a drilling-machine, the combination of a frame and means thereon for holding the work in a stationary position, a traveling-head on the frame, stops adjustable along the path of the head to the positions, with reference to the work, where the drilling operations are to occur, propelling means for the head, a drill, drill-rotating means, drill-advancing means and drill-retracting means, all carried by the head, stop-engaging and disengaging latch-mechanism on the head, locking means upon the head operating when moved into register with a stop to engage the same, mechanisms, actuated by the engagement of the latch-mechanism with a stop, for stopping the said propelling means, operating the said locking means, to lock the head in position, and actuating the drill-advancing means, and mechanism actuated by the final advance movement of the drill to retract the latter, release the lock and mechanism from the stop and start the said propelling means.

5. In a drill-machine of the character described, the combination of a work-holding frame, an intermittently movable traveling-head on the frame, a drill, drill-rotating mechanism, electro-pneumatic drill-advancing and retracting mechanism, and head starting, stopping and positioning mechanisms all carried by the head, and adjustable stops on the frame, in the path of said head, operating to stop and then release the head and to actuate said electro-pneumatic mechanism during each pause of the head, for the purpose set forth.

6. In a drilling-machine, the combination of a frame for holding the work in a stationary position, a traveling-head with means for moving it upon the frame along the work, adjustable stops on the frame, a rotating drill on the head, advancing and retracting mechanism for the drill, mechanism for starting and stopping the travel of the head, a stop-engaging latch on the head, mechanism for locking the head to and unlocking it from the frame, and electro-pneumatic means upon the head, controlling the operations of said mechanisms, actuated by engagement of the latch with a stop to cause the head to pause, then to position and lock the head to the frame, then to advance and retract the drill, then to unlock the head from the frame and then to start travel of the head.

7. In a drilling-machine of the character described, the combination of a work-holding frame, an intermittently movable traveling-head on the frame, a plurality of drills, with rotating means and advancing and retracting means therefor on the head, and stops on the frame in the path of the head adjustable to regulate the intermittent movement of the head and the operation of one or more of the drills during the pauses of the head, for the purpose set forth.

8. In a drilling-machine, the combination of a cylinder, piston in the cylinder, drill-shaft connected with the piston, turning means for the drill-shaft, a compressed-air supplier, means for directing compressed-air from the supplier into the cylinder to advance the piston and drill-shaft, means for retracting the piston and drill-shaft, an oil-chamber communicating with the cylinder, oil-check mechanism, operating to retard the flow of oil from the cylinder to the chamber, in the advance of the piston, thereby controlling the feed of the drill-shaft, and means for causing quick return of oil to the cylinder as the piston is retracted, for the purpose set forth.

9. In a drilling-machine of the character described, the combination of a work-holding frame, a traveling-head on the frame, head engaging and releasing stops on the frame, a plurality of drills on the head, propelling means for the head, drill-rotating means, electro-pneumatic advancing mechanism and retracting means for each drill on the head, a separate actuating latch on the head for each of the said electro-pneumatic mechanisms, the latches being in different planes, and removable and replaceable pins on the frame each extending into the path of one or more of said latches, for the purpose set forth.

CHARLES H. ANDERSON.

In presence of—
R. A. RAYMOND,
R. A. SCHAEFER.